(12) United States Patent
Sainsbury et al.

(10) Patent No.: US 8,703,023 B2
(45) Date of Patent: Apr. 22, 2014

(54) FUNCTIONALIZED BORON NITRIDE NANOTUBES

(75) Inventors: Toby Sainsbury, Dublin (IE); Takashi Ikuno, Aichi (JP); Alexander K. Zettl, Kensington, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/527,369

(22) Filed: Jun. 19, 2012

(65) Prior Publication Data

US 2012/0273733 A1    Nov. 1, 2012

Related U.S. Application Data

(63) Continuation of application No. 12/516,182, filed as application No. PCT/US2007/085383 on Nov. 21, 2007, now abandoned.

(60) Provisional application No. 60/867,085, filed on Nov. 22, 2006.

(51) Int. Cl.
*H01B 1/20* (2006.01)

(52) U.S. Cl.
USPC .......................................... 252/500; 423/290

(58) Field of Classification Search
USPC .......................................... 252/500; 423/290
See application file for complete search history.

(56) References Cited

U.S. PATENT DOCUMENTS

| | | | |
|---|---|---|---|
| 2,375,016 A | 5/1945 | Marple et al. | |
| 6,495,258 B1 * | 12/2002 | Chen et al. | 428/408 |
| 6,676,651 B2 * | 1/2004 | Haacke et al. | 604/533 |
| 6,676,851 B1 * | 1/2004 | Buchecker et al. | 252/299.67 |
| 6,875,274 B2 * | 4/2005 | Wong et al. | 117/105 |
| 6,882,094 B2 * | 4/2005 | Dimitrijevic et al. | 313/346 R |
| 7,105,553 B2 * | 9/2006 | Fischer et al. | 514/369 |
| 2005/0008561 A1 * | 1/2005 | Fischer et al. | 423/447.1 |
| 2006/0058360 A1 * | 3/2006 | Boulet et al. | 514/367 |
| 2006/0084705 A1 * | 4/2006 | Caruso et al. | 516/20 |
| 2006/0239891 A1 * | 10/2006 | Niu et al. | 423/445 R |
| 2006/0249705 A1 * | 11/2006 | Wang et al. | 252/62.51 C |

OTHER PUBLICATIONS

Jiesheung et al. Nano Letters, 2005, vol. 5 No. 12, 2528-2532.*
Zhi et al. Angew. Chem. Int. Ed. 2005, 44, 7932-7935.*
Chengchun et al. Chem. Commun. 2002, 1290-1291.*
Cumings et al. Chemical Physics Letters 316 (2000) 211-216.*
Azamian et al. Chem. Comun. 2002, 366-367.*
Azamian et al., "Directly observed covalent coupling of quantum dots to single-wall carbon nanotubes," Chemical Communications, pp. 366-367, (Feb. 5, 2002).
Ellis et al., "Hydrophobic Anchoring of Monolayer-Protected Gold Nanoclusters to Carbon Nanotubes," Nano Letters, vol. 3, No. 3, pp. 279-282, (2003).
Ikuno et al., "Amine-functionalized boron nitride nanotubes," Solid State Communications, vol. 142, pp. 643-646, (Apr. 19, 2007).
Sainsbury et al., "Self-Assembly of Gold Nanoparticles at the Surface of Amine- and Thiol-Functionalized Boron Nitride Nanotubes," The Journal of Physical Chemistry C, vol. 111, No. 35, pp. 12992-12999, (2007).
Tang et al., "A novel precursor for synthesis for pure boron nitride nanotubes," Chemical Communications, pp. 1290-1291, (May 21, 2002).
Wang et al., "Low Temperature Growth of Boron Nitride Nanotubes on Substrates," Nano Letters, vol. 5, No. 12, pp. 2528-2532, (2005).
Wu et al., "Chemical Functionalization of Boron-Nitride Nanotubes with NH and Amino Functional Groups," Journal of the American Chemical Society, vol. 128, No. 36, pp. 12001-12006, (2006).
Cumings et al., "Mass-production of boron nitride double-wall nanotubes and nanococoons," Chemical Physics Letters, vol. 316, pp. 211-216, (Jan. 14, 2000).
Zhi et al., "Covalent Functionalization: Towards Soluble Multiwalled Boron Nitride Nanotubes," Angewandte Chemie International Edition, vol. 44, pp. 7932-7955, (2005).
Mickelson et al.,"Packing C60 in Boron Nitride Nanotubes," Science, vol. 300, pp. 467-469, (Apr. 18, 2003).
Xie, S. Y.; Wang, W.; Shiral Fernando, K. A.; Wang, X.; Lin, Y.; Sun, Y. P. Chem. Commun. 2005, 3670-3672.
Zhi, C. Y.; Bando, Y.; Tang, C. C.; Xie, R. G.; Sekiguchi, T.; Golberg, D. J. Am. Chem. Soc. 2005, 127, 15996.
International Search Report and Written Opinion for International Application No. PCT/US07/85383 mailed Jan. 21, 2009.
U.S. Office Action for U.S. Appl. No. 12/516,182 mailed Dec. 29, 2011.
Notice of Reasons for Rejection for Japanese Patent Application No. 2009-538505 mailed Mar. 21, 2013.

* cited by examiner

*Primary Examiner* — Nicole M Buie-Hatcher
*Assistant Examiner* — M. Reza Asdjodi
(74) *Attorney, Agent, or Firm* — Lawrence Berkeley National Laboratory

(57) ABSTRACT

A plasma treatment has been used to modify the surface of BNNTs. In one example, the surface of the BNNT has been modified using ammonia plasma to include amine functional groups. Amine functionalization allows BNNTs to be soluble in chloroform, which had not been possible previously. Further functionalization of amine-functionalized BNNTs with thiol-terminated organic molecules has also been demonstrated. Gold nanoparticles have been self-assembled at the surface of both amine- and thiol-functionalized boron nitride Nanotubes (BNNTs) in solution. This approach constitutes a basis for the preparation of highly functionalized BNNTs and for their utilization as nanoscale templates for assembly and integration with other nanoscale materials.

25 Claims, 12 Drawing Sheets

FUNCTIONALIZED BORON NITRIDE NANOTUBES

CROSS-REFERENCE TO RELATED APPLICATIONS

This application is a continuation of U.S. application Ser. No. 12/516,182, entitled Functionalized Boron Nitride Nanotubes filed on Jul. 10, 2009; which in turn claims priority to PCT Application No. PCT/US2007/085383, entitled Functionalized Boron Nitride Nanotubes filed on Nov. 21, 2007; which in turn claims priority to U.S. Patent Provisional Application 60/867,085, entitled Gold Nanoparticles on Amine-Functionalized Boron Nitride Nanotubes, filed Nov. 22, 2006, all of which applications are incorporated in their entirety for all purposes by reference herein.

STATEMENT OF GOVERNMENTAL SUPPORT

The invention described and claimed herein was made in part utilizing funds supplied by the U.S. Department of Energy under Contract No. DE-AC02-05CH11231. The government has certain rights in this invention.

BACKGROUND OF THE INVENTION

Field of the Invention

Embodiments of this invention relate generally to boron nitride nanotubes, and, more specifically, to functionalization of boron nitride nanotubes and the structures that can be formed therefrom.

In recent years considerable research effort has been directed towards the synthesis and characterization of nanoscale materials because of their novel mechanical, electronic, thermal and chemical properties. In particular, nanotubes of both carbon and boron nitride have generated interest due to their remarkable intrinsic properties. A key feature that has enabled many developments using carbon nanotubes (CNTs) has been that the surface of carbon nanotubes can be chemically modified or functionalized. This has allowed CNTs to be solubilized in a range of solvents, integrated with host materials to form composites, and assembled with other nanoscale materials in solution and on substrates. These advancements in turn have allowed CNT based materials to be used in the development of novel sensory, electronic, catalytic, and materials applications. While there have been significant developments with CNTs, there has been comparatively little progress with boron nitride nanotubes BNNTs) and their integration with other nanoscale materials.

Boron nitride nanotubes (BNNTs) have a cylindrical structure and show excellent mechanical and thermal properties. In contrast to carbon nanotubes, which can exhibit either metallic or semiconducting characteristics, BNNTs are semi-conductors with a uniform wide bandgap (~5.5 eV). In addition, BNNTs have high resistance to oxidation and are structurally stable and inert to most chemicals. It would be useful to find a way to exploit the intrinsic properties of BNNTs for various materials and device applications. In order to do this, surface modification of the BNNT, including functionalization with small molecules, polymers, nanoparticles, and thin films, would be useful. Modification of BNNTs, such as the generation of a high density of functional groups on the surface of BNNTs, is believed to have much potential for the utilization of these materials as nanoscale templates and for their integration with other nanoscale materials to form assemblies for chemical and biochemical applications, electronic device components or composite materials.

One strategy that has been used to assemble and organize nanoscale materials is directed-self-assembly using specific functional groups. Thus, the surface functionalization of nanoscale materials is of much interest in order to control their assembly in solution and on substrates. For example, if BNNTs are to be used as components in a mechanical reinforcement composite, then the interfaces between the BNNTs and the other composite materials (e.g. the epoxy or the polymer) are critical. The interfaces can be changed by altering the surface chemical functionality of the nanotubes. Similarly, adding, embedding, or substituting foreign elements or species on or into the outer layer or layers of a BNNT can transfer charge to the nanotube, changing its electronic structure and hence its electrical, optical, and even magnetic properties. For example, if BNNTs could be doped, their electrical conductance could be altered. But the INSIDE surface can be manipulated as well, which in turn (via mechanical deformation or charge transfer) changes the chemical reactivity of the outside of the tube.

If BNNT surfaces could be functionalized, BNNTs could be solubilized in various solvents. The ability to solubilize, disperse, or suspend BNNTs in solvents would not only aid in their purification but would also open up new processes for formation of nanoscale architectures that include BNNTs. Up until now, the inherently low chemical reactivity of the surface of well-crystallized BNNTs makes solution-based reactions particularly ineffective.

In order to modify the relatively unreactive exterior of BNNTs, reactive treatments under non-equilibrium conditions may be required. A common technique is glow plasma treatment, which is widely used for the modification, etching, and polymerization of solid surfaces in microfabrication. It is well known that plasmas contain electrically active species such as radicals, ions, and clusters, and that plasma conditions can be precisely controlled. As a result, this technique has great potential for the introduction of reactive surface functionalities onto generally unreactive substrates such as BNNTs.

BRIEF DESCRIPTION OF THE DRAWINGS

FIG. 16(b) is a B map. FIG. 16(c) is C map. FIG. 16(d) is a N map.

DETAILED DESCRIPTION

Figure 1:
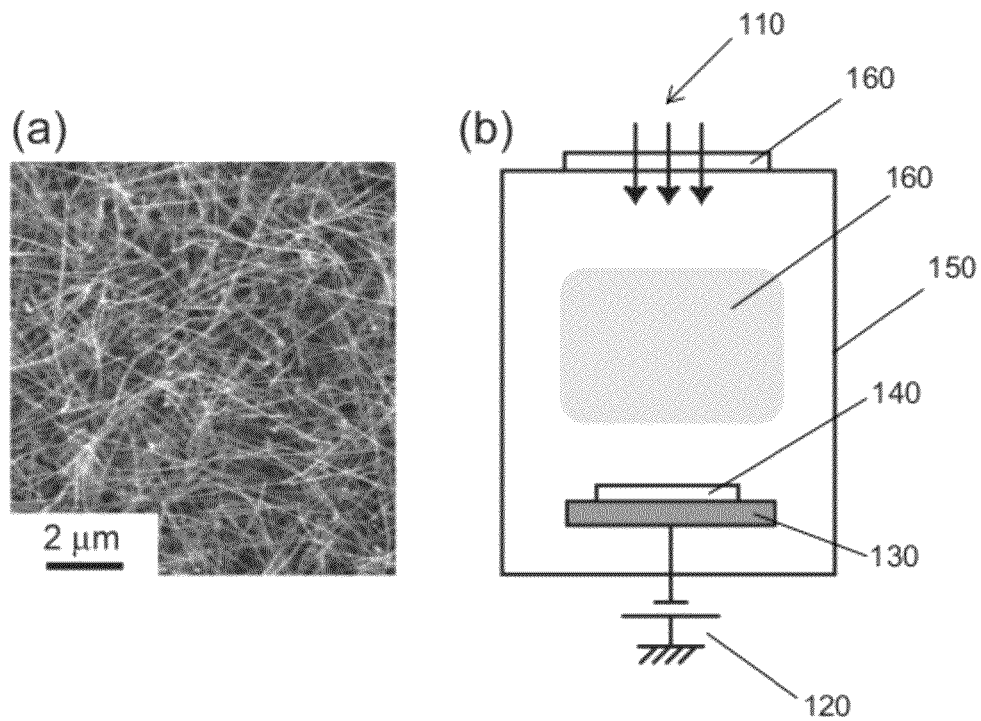
FIG. 1(a) is a SEM image of pristine BNNTs on a Si substrate that can be used for plasma treatment.
FIG. 1(b) is a schematic illustration of a plasma system according to an embodiment of the invention.

One embodiment of the invention provides a boron nitride nanotube with first organic molecules attached to its surface. Such a structure is a first step in being able to functionalize BNNTs with yet other materials. By their nature, BNNTs are inert to most chemicals and to most treatments. Until now it has not been possible to make physical attachments to BNNTs, and therefore it has not been possible to functionalize them. It should be understood that an unadulterated BNNT is a hollow tube that has both an exterior surface and an interior surface. The embodiments of the invention as described herein can act on either or both these surfaces.

In specific embodiments, the first organic molecules attached to the BNNT surface are amines, carboxyls, imines, hydroxyls and/or nitriles.

In some embodiments of the invention, second organic molecules are coupled to the first organic molecules on the surface of the BNNT. In one arrangement, the second organic molecule is 3-bromopropanoylchloride. In one arrangement, the second organic molecule is a thiol. The thiol can be 3-mercaptopropionic acid.

In some embodiments of the invention, nanoparticles are coupled to the first organic molecules on the surface of the BNNT or to the second organic molecules.

In some embodiments of the invention, other species are coupled to the first organic molecules on the surface of the BNNT or to the second organic molecules. Examples of such species include other organic molecules, inorganic molecules, nanoparticles, bio-molecules quantum dots, polymers, or other structures.

In another aspect, embodiments of the invention relate to methods of making the structures described above. A method of making the basic BNNT/first organic molecule structure involves treating BNNTs with a plasma. The gas or gas mixture used to make the plasma determines the kind of organic molecules that attach to the BNNTs. Yet other methods describe ways to attach additional species to the basic BNNT/first organic molecule structure.

A plasma is an ionized gas. Plasmas can be produced by any of a variety of methods and no such method is meant to excluded from the methods disclosed herein. The exemplary embodiments use a microwave plasma, but it is to be understood that plasmas made by other means, such as, for example, glow discharge, high-frequency RF fields and inductive coupling.

The term "modify" is used herein to mean change, whether the change does or does not result in a change in functionality. The term "functionalize" is used herein to mean modify or change when the change results in the addition of a new "functional" group that had not been present previously.

The term BNNT "surface" is used herein to mean the exterior and/or the interior surface of a BNNT. The term "pristine" BNNT is used herein to mean a BNNT that has not yet undergone any of the processes described in the embodiments of the invention herein. Some "pristine" BNNTs may be as produced, having undergone no subsequent processing at all. Some "pristine" BNNTs may have undergone processing that has modified the interior in some way or that has introduced foreign species into their interior. An example of such a modification can be found in, "Packing C60 in Boron Nitride Nanotubes," *Science* 300 467-9 (2003) by W. Mickelson, S. Aloni, Wei-Qiang Han, John Cumings, and A. Zettl, which is included by reference herein. In some cases, without using the term "pristine," one can tell from the context that BNNTs that have not yet undergone any of the inventive processes are meant. Such BNNTs are understood to include the same sorts of BNNTs as are meant by the term "pristine" BNNTs.

The following abbreviations are used throughout this disclosure:
AF-BNNT amine-functionalized boron nitride nanotube
MPA-BNNT amine-functionalized boron nitride nanotube with additional MPA functionalization
MPA-BNNT (without AF) boron nitride nanotube that has not been first amine-functionalized and an attempt has been made to functionalize directly with MPA
BPC-BNNT amine-functionalized boron nitride nanotube with additional BPC functionalization
BPC-BNNTs (without AF), boron nitride nanotube that has not been first amine-functionalized and an attempt has been made to functionalize directly with BPC BNNTs can be synthesized on Si substrates by thermal decomposition of B and MgO powders in an ammonia environment at 1200° C. in an electric furnace. FIG. 1(a) shows a typical scanning electron microscope (SEM) image of BNNTs produced by this method. Average diameters and lengths of the BNNTs are 20 nm and more than 10 respectively. Other methods of synthesizing BNNTs are known in the art and can be used in embodiments of the invention. The embodiments of the invention are directed to treatment of already formed BNNTs and the structures that result from such treatment.

Functionalization with Amines

In one embodiment of the invention, amine functional groups are generated at the surface of a BNNT using an ammonia plasma treatment in a microwave plasma generator. FIG. 1(b) shows a schematic of a microwave plasma generator 110. In an exemplary embodiment, the system 110 is equipped with a 1.5 kW microwave generator (not shown), a DC power supply 120 for a carbon substrate holder 130, and an ammonia gas line (not shown). A substrate 140 containing BNNTs is put on the carbon holder 130 inside a vacuum chamber 150. The chamber 150 is pumped down to less than about 0.3 Pa. The ammonia gas (~10 sccm) is then flowed into the chamber under a pressure of about 400 Pa. An ammonia plasma is generated by applying about 200 W of microwave power through a quartz window 160 at the top of the chamber 150 and a negative bias of about 100 V bias to the substrate holder 130 for about 10 min at room temperature. In some arrangements the bias voltage can be between about −50 V and −200V. In some arrangements, the applied power is between about 100 W and 500 W. After the plasma is generated, the substrate 110 temperature is about 200° C. due to plasma bombardment of the holder. The dose in this condition is estimated to be about $1.3 \times 10^{15}$ ions/cm². Amine-functionalized BNNT material (AF-BNNT) on the substrate is then recovered by sonicating the substrate in deionized water.

Figure 2:
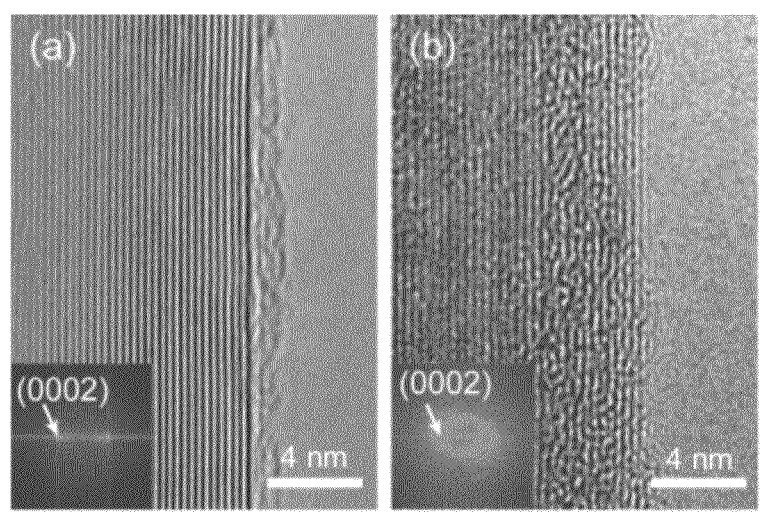
FIG. 2 shows high-resolution TEM images and Fourier transform images (insets) of the wall of (a) a pristine BNNT and (b) an ammonia plasma-treated BNNT. Scale bar, 4 nm.

FIGS. 2(a) and 2(b) show high resolution transmission electron microscope (HR-TEM) images of the wall of a BNNT before and after ammonia plasma treatment, respectively, where the long direction in both images is along the nanotube axis. Insets show Fourier transform images of the BNNTs at the edge region. As FIG. 2(a) shows that before plasma treatment, straight BN lattice planes are clearly visible. The Fourier transform image shows two sharp spots which correspond to the BNNT (0002) plane. The defocused structure at the surface in FIG. 2(a) is residual amorphous BN material.

FIG. 2(b) shows that after plasma treatment, the outermost 6-8 BN lattice planes (2-3 nm thickness), have a defective, wavy structure that includes lattice bending and atomic vacancies. The Fourier transform image shows a halo pattern around the BN (0002) spots. The halo indicates local defects in the BNNT outer layers as compared to the pristine BNNTs shown in FIG. 2(a).

Figure 3:
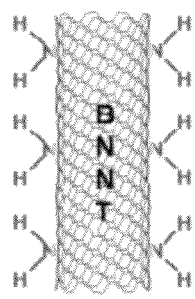
FIG. 3 is a schematic drawing of a BNNT functionalized with amines (AF-BNNT).

During plasma treatment, the substrate temperature is about 200° C. BNNTs have been shown to be extremely stable at such temperatures, even in oxygen environments. Thus the thermal effect on the BN lattice at 200° C. is negligible. Bombardment by ions and radicals in the ammonia glow plasma seems to be the cause of the defective lattice planes observed after irradiation, as shown in FIG. 2(b). A schematic drawing of a BNNT functionalized with amines ($NH_2$), referred to as AF-BNNT, is shown in FIG. 3.

Without wishing to be bound to any particular theory, a model is proposed to aid in under the amine functionalization mechanism. According to optical emission spectroscopy (OES) studies of typical low-temperature-ammonia glow plasmas, the primary excited species in the ammonia plasma are $N_2$, $N_2^+$, $NH_2$, $NH$, and $H$ atoms. Among these species, the $N_2^-$ ion is likely to be attracted to BNNTs which are biased negatively. Other positive ions; $NH^+$, $NH_2^+$ and $NH_3^+$ are rare in ammonia plasma because their ionization energies are typically above 10 eV, which is larger than the electron temperature in the plasma. Since the kinetic energy of $N_2^+$ ions around the substrate is about 100 eV, much larger than the cohesive energy of a hexagonal B—N bond (7-8 eV), defects could be created at the BNNT surface by ion collision and displacement of some B and/or N atoms. Radicals such as $NH_2^*$ or $H^*$ could terminate the resulting vacancies at the surface. In this case, the dynamic repetition of defect creation by positive ions and termination of vacancies by radicals would produce BNNT surfaces functionalized with amine groups. The amine groups, in turn, are active sites onto which yet other species can be bound.

In other arrangements, other gases can be used in the microwave plasma, resulting in other kinds of functionalization of BNNTs. Some non-limiting examples include:

| Gas Mixture in Plasma | Functionalization on BNNTs |
| --- | --- |
| $H_2 + N_2$ | amine |
| $CH_4 + O_2$ | carboxy |
| $CH_4 + N_2$ | imine |
| $H_2O$ | hydroxyl |
| $N_2 + O_2$ | nitrile |

Further Functionalization with BPC

In one embodiment, molecules of 3-Bromopropanoylchloride. (BPC) are coupled to the AF-BNNTs. The coupling of the BPC molecule with the surface of the AF-BNNTs involves immersing the AF-BNNTs in a liquid BPC reagent. In some arrangements the AF-BNNT/BPC mixture can be sonicated. Amides are formed between acid chloride groups of the BPC molecules and the amine groups. The materials can be stirred for several hours and then isolated using membrane filtration. Following filtration, it can be useful to wash the AF-BNNTs extensively with BPC using ethanol.

Figure 4:
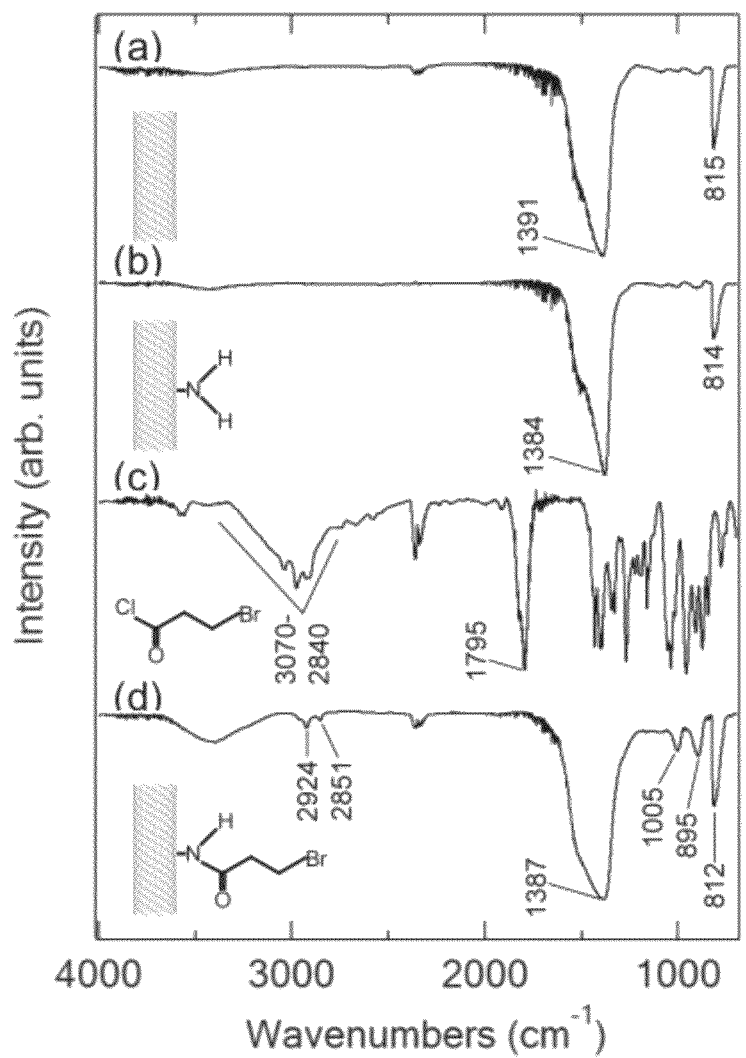
FIG. 4 shows FUR spectra of (a) pristine BNNTs, (b) amine-functionalized BNNTs, (c) free BPC molecules, and (d) amine-functionalized BNNTs modified with the BPC molecules.

FIG. 4 shows the FT-IR spectra of (a) pristine BNNTs, (b) amine-functionalized BNNTs, (c) free BPC molecules, and (d) AF-BNNTs modified with BPC molecules (BPC-BNNTs). The spectrum of the pristine BNNTs exhibits two distinct peaks at 1391 cm$^{-1}$ and 815 cm$^{-1}$, which are in good agreement with previously published results. The spectrum of the amine-functionalized BNNTs exhibit essentially the same peaks as those seen in the spectrum of the pristine BNNTs. This may be due to the heterogeneity of the surface of the BNNTs, as shown by HRTEM (high resolution transmission electron microscopy), and the different environments of the amine groups at the surface of the BNNTs.

The spectrum of the free molecule BPC (FIG. 4c) shows peaks attributed to the carbonyl stretch of the acid chloride and a bending mode of the Br—$CH_2$ at 1795 cm$^{-1}$ and 1268 cm$^{-1}$ respectively. The peaks attributed to the stretching and bending vibrations of the methylene groups are believed to be present in the regions 3070-2840 cm$^{-1}$ and 1480-1370 cm$^{-1}$ respectively. The large spread in these values is attributed to the combination of both the acid chloride and bromine groups adjacent to the methylene groups, which consequently makes accurate assignment of the peaks difficult.

In the spectrum of the BPC-BNNTs (FIG. 4d), the peaks due to the B—N axial vibrations and vibrations perpendicular to the axis of the tubes are identified at 1387 cm$^{-1}$ and 812 cm$^{-1}$ respectively. In contrast to the spectrum of the free BPC molecules in which the exact position of the methylene groups of the alkyl chain cannot accurately be identified, in the spectrum of the BPC-BNNTs, peaks at 2924 cm$^{-1}$ and 2851 cm$^{-1}$ are assigned to the asymmetric and symmetric stretching vibrations of the methylene groups in the BPC molecules. It is expected that the fact that these groups may be identified positively gives good evidence to a change in the local environment of the molecules consistent with amide formation. The appearance of two peaks at 1005 cm$^{-1}$ and 895 cm$^{-1}$ are tentatively assigned to the C—N stretch and the N—H out of plane wagging, respectively, of the amide of the BPC molecules at the surface of the BNNTs. While the identification of these peaks seems reasonable it is noted that the precise assignment of peaks in this region is non trivial. In addition to the appearance of these peaks, in the spectrum of the free BPC acid chloride molecule, the stretching vibration of the carbonyl of the acid chloride is identified at 1795 cm$^{-1}$, while in the spectrum of the BPC-BNNTs this peak is absent. It is believed that amide formation leads to a significant shift in the position of the carbonyl group, leading to its overlap with the stretching vibration attributed to the transverse optical mode of the BNNT between 1700 cm$^{-1}$ and 1220 cm$^{-1}$, and therefore the carbonyl group is not visible in the spectrum. Overall, the FT-IR data provides support for the assertion that the bromopropyl moieties are covalently bound to the surface of the BNNTs.

Figure 5:
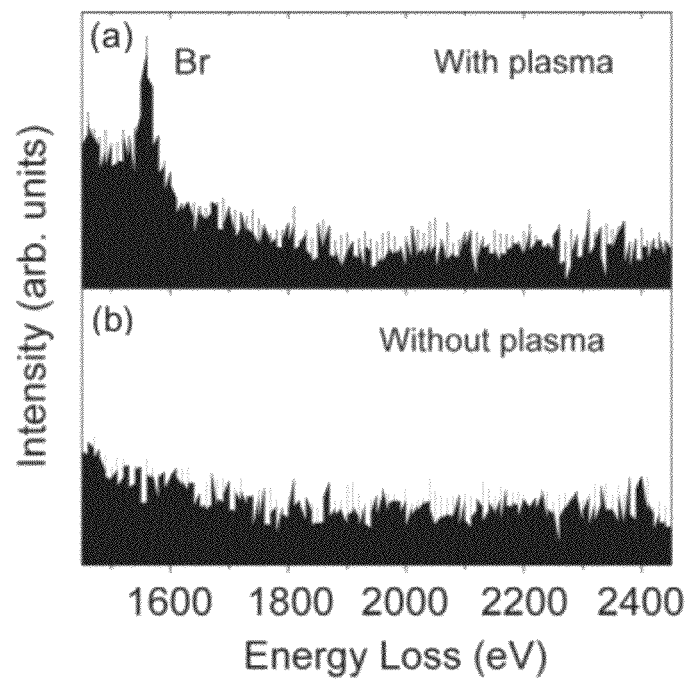
FIG. 5 shows electron energy loss spectrum of isolated BNNTs treated with BPC (a) with and (b) without prior ammonia plasma treatment.

Pristine BNNTs that had not been treated by an ammonia plasma (BPC-BNNT (without AF)) were subjected to the same exposure to BPC molecules as AF-BNNTs, as described above. Electron energy loss spectroscopy (EELS) analysis was performed on both the BPC-BNNTs, which had previously undergone amine functionalization through had plasma treatment, and the BPC-BNNTs (without AF), which had had no plasma treatment, as shown in FIGS. 5a and 5b, respectively. BPC-BNNTs (FIG. 5a) with plasma treatment exhibited a Br peak at about 1550 eV, suggesting that attachment of BPC molecules to the nanotubes had occurred. BPC-BNNTs (without AF) without plasma treatment (FIG. 5b) showed no Br peak in the EELS spectrum. This result, along with the data available from the FT-IR analysis indicates that the AF-BNNTs are sufficiently modified to allow attachment of BPC molecules; the BNNTs are amine-functionalized by plasma treatment.

Figure 6:
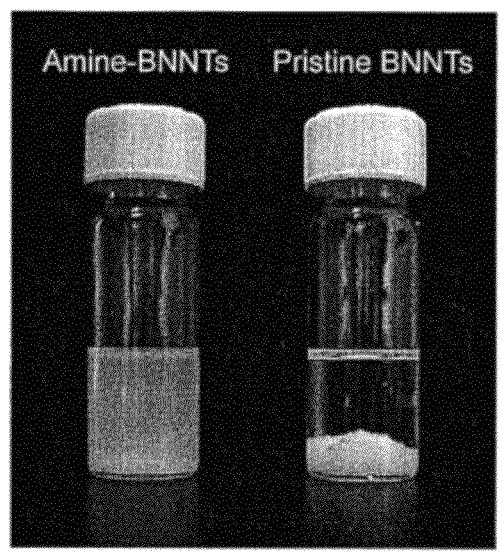
FIG. 6 shows photographs of vials containing amine-functionalized BNNTs (f side) and the pristine BNNTs (right side) in chloroform after standing for 5 hours.

Following a brief sonication of AF-BNNTs in chloroform, the material was found to be well suspended after a significant time interval. FIG. 6 shows dispersions of both AF-BNNTs and pristine BNNTs in chloroform after standing for 5 hours. AF-BNNTs have much greater solubility in chloroform. The AF-BNNTs dispersion maintained a milky color even after standing for 7 days, indicating extremely stability. The pristine BNNTs showed no such solubilization. After standing for 5 min, significant quantities of pristine BNNTs precipitated out of the dispersion. After 30 min, the supernatant solution appeared transparent. TEM observation of both supernatant solutions showed that the amine-functionalized BNNT solution contained many nanotubes, while nanotubes were found in the pristine BNNT solution only rarely. The ability to suspend the amine-functionalized BNNTs in a useful organic solvent such as chloroform is a big step toward using solution-based chemistry to further modify BNNTs. Such suspension of BNNTs in an organic solvent is not limited to chloroform. AF-BNNTs can be expected to solubilize in any number of organic solvents. In one arrangement, any solvent in which amine groups can solubilize will also allow solubilization of AF-BNNTs.

Further Functionalization with MPA

Figure 7A:
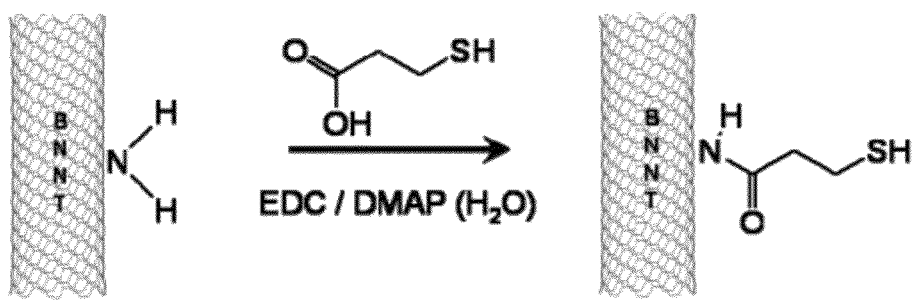
FIG. 7(a) is a schematic drawing that shows how BNNTs are functionalized with 3-mercaptopropionic acid (MPA) via amide formation.
Figure 7B:
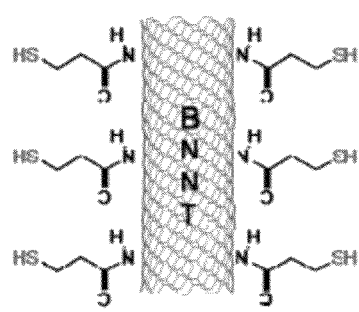
FIG. 7(b) is a schematic drawing of a BNNT functionalized with thiols (MPA-BNNT).

Once amine functional groups are attached to BNNTs, other species can be attached to the amine groups. In an exemplary embodiment, amine functional groups attached to BNNTs are used to couple short chain organic molecules terminated with a thiol, 3-mercaptopropionic acid (MPA), to the surfaces of the BNNTs via standard diimide-mediated amide formation as illustrated in FIG. 7(a). A solution of 3-mercaptopropionic acid (MPA) (50 μL, 5.74×10$^{-4}$ mol), N-(3-dimethylaminopropyl)-N-ethylcarbodiimide hydrochloride (EDC) (0.132 g, 6.88×10$^{-4}$ mol) and 4-dimethylaminopyridine (DMAP) 4.20×10$^{-3}$ g, 344×10$^{-5}$ mol) in de-ionized water (5 mL) is added to a freshly sonicated suspension of amine-functionalized (AF) BNNTs (0.5×10$^{-3}$ gmL$^{-1}$) deionized water (5 mL). In one arrangement the mixture is stirred for 12 hour. The material can be filtered using membrane filtration apparatus, and washed with de-ionized water. The MPA-modified BNNT material can be sonicated off the filter membrane into de-ionized water (500 mL) and sonicated for about 5 minutes to disperse the nanotubes. If molecular contaminants are of concern, the material can be filtered and washed once more using the membrane filtration apparatus in order to rid the BNNT material of any molecular contaminants. The MPA-modified BNNTs (MPA-BNNTs) can be sonicated off the membrane filter into &ionized water (10 mL). A schematic drawing of a BNNT functionalized with MPA or thiols (MPA-BNNT) is shown in FIG. 7b.

Figure 8:
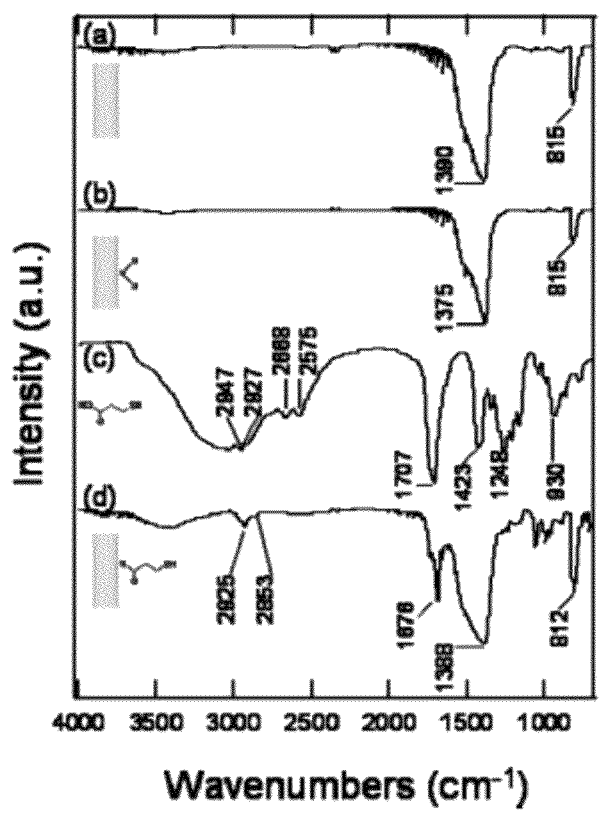
FIG. 8 shows FT-IR spectra for (a) unmodified BNNTs, (b) amine-functionalized BNNTs, (c) free 3-mercaptopropionic acid (MPA), and (d) MPA-functionalized BNNTs.

FT-IR spectroscopy confirms modification of the BNNTs with the short chain MPA molecules. The spectrum of pristine BNNTs (FIG. 8(a)) exhibits two characteristic vibrational modes of BNNTs; the in-plane axial B—N—B vibration, centred at 1390 cm$^{-1}$ and the out-of-plane B—N vibration tangential to the nanotube axis, centred at 815 cm$^{-1}$. The spectrum of the amine-functionalized BNNTs (FIG. 8(b)) exhibits essentially the same peaks as that of the pristine BNNTs at 1375 cm$^{-1}$ and 815 cm$^{-1}$. The shift from 1390 cm$^{-1}$ to 1375 cm$^{-1}$ for the axial vibration of the BNNTs following amine functionalization indicates an increased disorder in the atomic arrangement within the nanotubes. This result points towards a significant perturbation of the walls of the BNNTs following the introduction of the amine functional groups. The assumed heterogeneity of these functional groups results in an assumed spread in the vibrational modes of the amine, and makes identification of the amine using FT-IR difficult.

The spectrum of free MPA molecules (FIG. 8©) exhibits peaks in agreement with reference spectra of the molecule. The broad O—H stretch is identified between 3300 cm$^{-1}$ and 2500 cm$^{-1}$. The C—H stretching vibrations at 2947 cm$^{-1}$ and a shoulder at 2927 cm$^{-1}$ are superimposed upon the O—H stretch. The S—H of the thiol is identified as two peaks at 2668 cm$^{-1}$ and 2575 cm$^{-1}$ because of hydrogen bonding between the acid and thiol groups. The carboxylic C=O stretch is evident at 1707 cm$^{-1}$, while the C—O—H in-plane bend and the C—O stretch are identified at 1423 cm$^{-1}$ and 1248 cm$^{-1}$, respectively, and the O—H out of plane bend is seen at 930 cm$^{-1}$.

The FT-IR spectrum of the MPA-modified BNNTs (MPA-BNNTs) (FIG. 8(d)) displays the characteristic vibrational modes of BNNTs at 1388 cm$^{-1}$ and 812 cm$^{-1}$. Notably, the axial vibrational mode of the BNNTs, centred at 1388 cm$^{-1}$ is visibly broadened. This may indicate disorder in the atomic arrangement of the BNNTs. The broadening effect may be a combination of the disordering effect due to modifications that occur within the surface walls of the BNNTs and the contribution from the core shells of the BNNTs, which retain their integrity, and thus the vibrational mode is spread over a range of frequencies. The spectrum of the MPA-BNNTs also exhibits several key changes from the spectrum of the pristine BNNTs shown in FIG. 8(a). Firstly, the appearance of peaks at 2925 cm$^{-1}$ and 2853 cm$^{-1}$ can be attributed to the asymmetric and symmetric stretch of the methylene groups of the MPA molecule, which indicates that the molecule is present on the MPA-BNNTs. Secondly, the appearance of an intense peak centered at 1676 cm$^{-1}$ can be attributed to the C=O stretching vibration of the amide between the MPA molecules and the BNNT-amino groups. The shift of 33 cm$^{-1}$ from the C=O of the free MPA acid provides strong support for the formation of the surface confined amide. The evidence seems to indicate that MPA is covalently bound to the surface of the BNNTs via amide formation.

Figure 9:
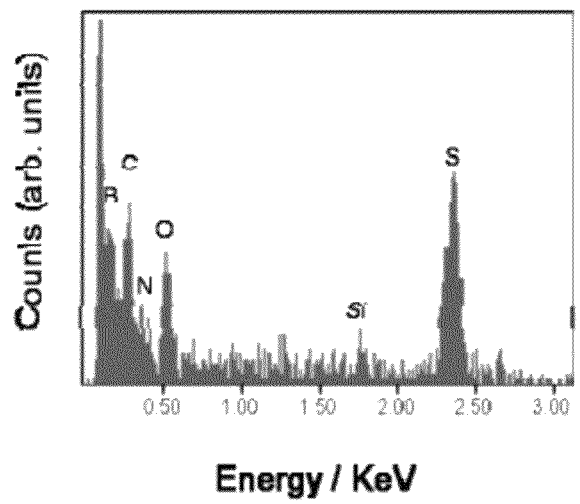
FIG. 9 is an EDS (energy dispersive x-ray spectroscopy) spectrum of MPA-BNNTs indicating the presence of S from the MPA molecules.

Energy-dispersive X-ray spectroscopy (EDS) also confirms that there are MPA molecules at the surface of the BNNTs. The EDS spectrum of the MPA-BNNTs shown in FIG. 9 contains B and N peaks from the BNNTs and also C, O and S peaks from the MPA molecules. The large sulphur peak in the EDS spectrum confirms that a significant amount of MPA is present in the MPA-BNNTs sample. FT-IR analysis indicates that there are essentially no residual free MPA molecules and that all MPA is covalently bound to the BNNTs via the amine groups. This may be due to the intensive washing procedure following the coupling of the MPA molecules to the BNNTs. The data also suggests that surfaces of the BNNTs are significantly functionalized with amine groups which facilitate the covalent coupling of the MPA molecules.

Figure 10:
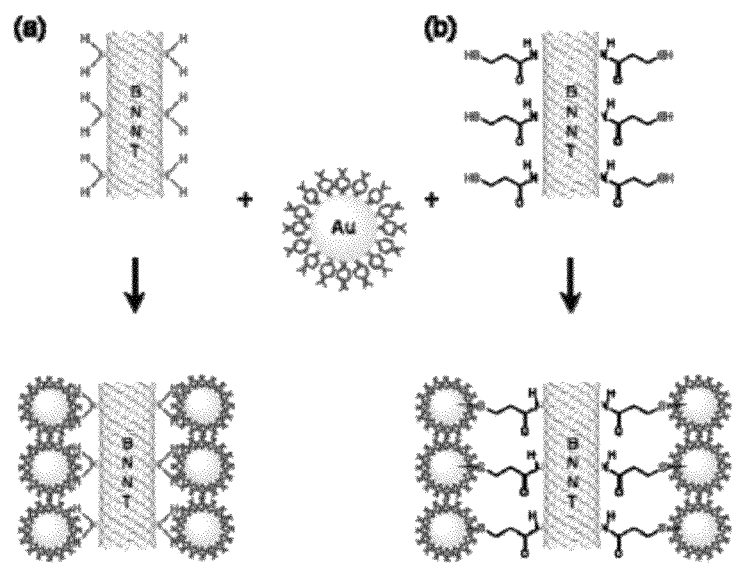
FIG. 10 is a schematic drawing that shows how gold nanoparticles can self-assemble at the surface of (a) amine-functionalized BNNTs and (b) thiol-functionalized BNNTs.

In some embodiments of the invention, amine functionalized BNNTs, AF-BNNTs and/or thiol-functionalized BNNTs (MPA-BNNTs) are used to direct self-assembly of gold nanoparticles onto the surface of the BNNTs, as illustrated schematically in FIG. 10. Gold nanoparticles are used as an example to illustrate a process by which any inorganic nanoparticle can be assembled onto a BNNT surface.

FIG. 10 is a schematic drawing that shows two methods to achieve gold nanoparticle functionalization of BNNTs. FIG. 10(a) shows functionalization via an amine route. FIG. 10(b) shows functionalization via a thiol route.

Figure 11:
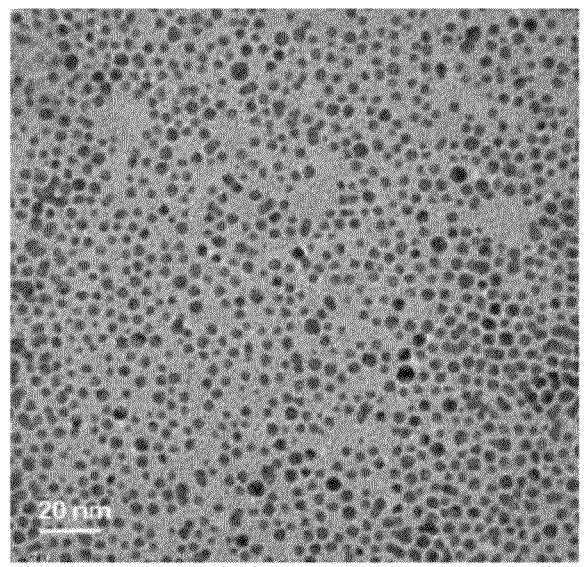
FIG. 11 is a TEM (transmission electron microscope) image of DMAP-stabilized gold nanoparticles.

In an exemplary embodiment, 4-Dimethylaminopyridine (DMAP) DMAP-stabilized gold nanoparticles are prepared. The procedure involves the reduction of an aqueous solution of gold salt in the presence of DMAP as follows: Hydrogen tetrachloroaurate (III) trihydrate, (0.150 g, 0.380 mmol) is dissolved in de-ionized water (12 mL), resulting in a bright yellow solution. 4-Dimethylaminopyridine (DMAP) (0.250 g, 2.046 mmol) in chloroform (12 mL) is then added slowly to the vigorously stirring gold solution. Following the addition of the DMAP, the mixture turns a brown color which turns to bright orange after approximately 20 minutes of stirring. Vigorous stirring is continued for two hours, after which time the phases have separated, with the bright orange aqueous phase being retained. The bright orange aqueous phase is then reduced by the addition of an aliquot (500 µL, 132 µmol) of a solution of sodium borohydride (0.100 g, 2.64 mmol) de-ionized water (10 mL). The vigorously stirring solution is reduced instantaneously, producing a ruby-red dispersion of DMAP-stabilized gold nanoparticles. This dispersion is stirred for a further one hour and then filtered using membrane filtration apparatus in conjunction with a polycarbonate membrane filter (20 nm pore diameter) in order to remove any aggregated material The dispersion is diluted by de-ionized water (1:10) and a drop (20 µL) is evaporated onto a carbon coated copper TEM grid. In this way, aqueous dispersions of DMAP-stabilized gold nanoparticles can be characterized using HR-TEM. A typical TEM image is shown in FIG. 11. The average gold nanoparticle diameter is approximately 5±0.5 nm.

In one arrangement, DMAP-stabilized gold nanoparticles (40 µL, $26.3 \times 10^{-3}$ gmL$^{-1}$) are added to a freshly sonicated (3 min) suspension of either AF-BNNTs or MPA-BNNTs (200 µL, $0.5 \times 10^{-3}$ gmL$^{-1}$) in de-ionized water (800 µL) and are allowed to equilibrate for 12 hours in a glass vial. A precipitate forms at the bottom of the glass vial. A sample of precipitate is deposited onto a 2000 square mesh copper TEM grid for analysis.

Figure 12:
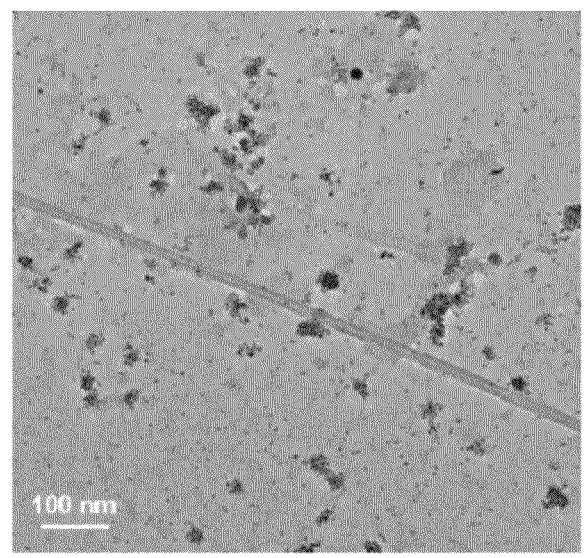
FIG. 12 is a low-resolution TEM image showing pristine a BNNT following its combination with DMAP-Au nanoparticles.

In order to compare differences in gold particle self-assembly on pristine BNNTs and functionalized. BNNTs, DMAP-stabilized gold nanoparticles (40 µL, X gmL$^{-1}$) are added to a freshly sonicated (3 min) suspension of pristine BNNTs (200 µL, $0.5 \times 1.0^{-3}$ gmL$^{-1}$) in de-ionized water (800 µL) and are allowed to equilibrate for 12 hours in a glass vial. A sample of precipitated material is taken from the bottom of the glass vial, and is deposited onto a 2000 square mesh copper TEM grid for analysis. As shown in the TEM image in FIG. 12, there is negligible assembly of gold nanoparticles at the surface of the pristine BNNTs. The lack of interaction between the pristine BNNTs and the gold nanoparticles indicates that there is no strong intrinsic attractive force between these materials under these conditions.

In one embodiment, self-assembly of gold km at the surface of both the amine-modified (AF) and MPA-BNNTs involves combining aqueous suspensions of the nanotubes and nanoparticles. Following equilibration of the materials for 12 hours, low-resolution and high-resolution TEM were used to characterize both the AM BNNTs and the BNNTs.

Figure 13:
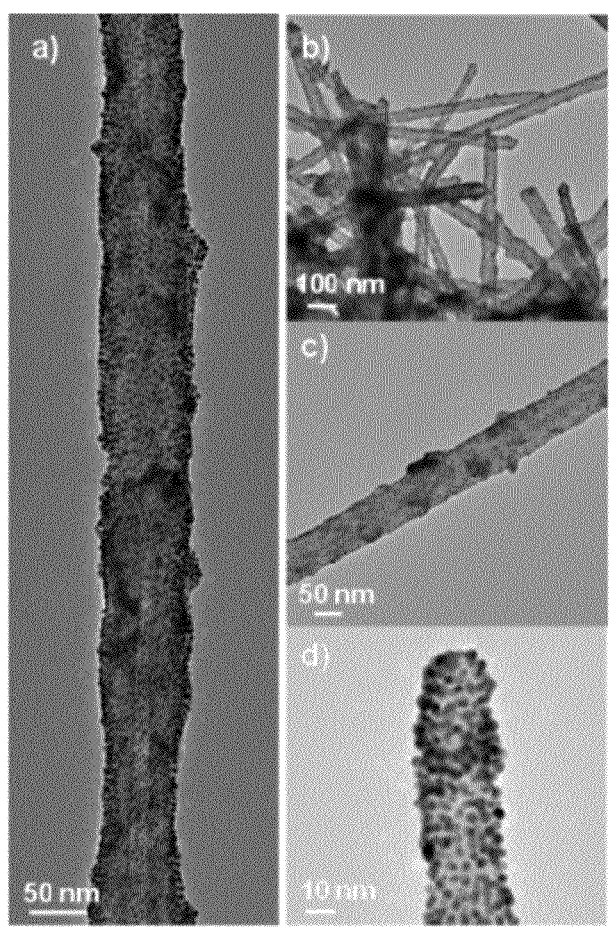
FIG. 13 shows typical low resolution TEM images of DMAP-stabilized gold nanoparticles self-assembled at the surface of different amine-functionalized BNNTs, where the lengths of the BNNTs shown are approximately 750 nm (a), 1 µm (b), 600 nm (c) and 100 nm (d).
Figure 14:
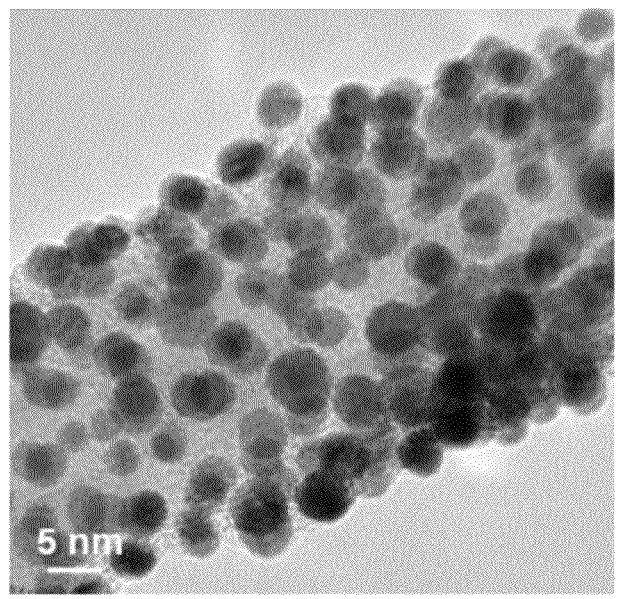
FIG. 14 is a HR-TEM (high resolution transmission electron microscope) image of DMAP-Au nanoparticles self-assembled at the surface of an amine-functionalized BNNT.

FIG. 13 shows low resolution TEM images of DMAP-stabilized gold nanoparticles self-assembled at the surface of different amine-functionalized BNNTs with various lengths. The AF-BNNTs are covered in a monolayer of DMAP-Au nanoparticles after their combination in solution. The driving force for the interaction may be the formation of weak covalent bonds between the BNNT bound amine functional groups and the surface of the gold nanoparticles. A High-Resolution TEM (HR-TEM) image of the self-assembly of the DMAP-Au nanoparticles at the surface of an amine-functionalized BNNT is shown in FIG. 14. The average diameter and number density of the particles on the BNNT surface are estimated to be approximately 5 nm and $4.5 \times 10^{12}$ cm$^{-2}$, respectively. The spacing between the particles ranges from approximately 1 nm to 4 nm.

Figure 15:
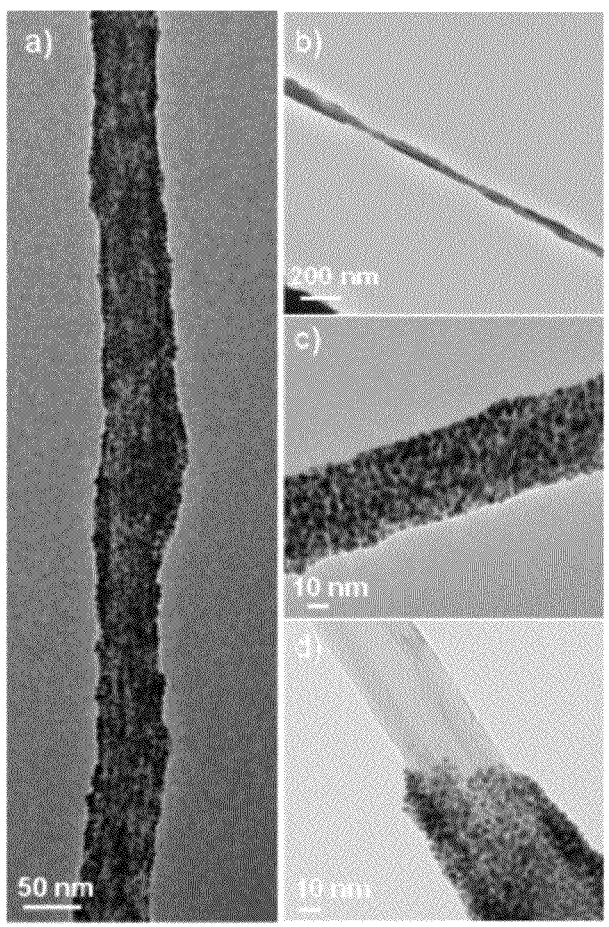
FIG. 15 shows typical low resolution TEM images of DMAP-stabilized gold nanoparticles self-assembled at the surface of different MPA-modified BNNTs, where the lengths of the BNNTs shown are approximately 750 nm (a), 2 µm (b), 160 nm (c) and 180 nm (d).

FIG. 15 shows the results of the self-assembly of a monolayer of the DMAP-stabilized gold nanoparticles at the surface of MPA-BNNTs. The nanoparticles are observed to form densely packed sheaths around the core BNNTs, as is evident in FIG. 15c. The driving force for the interaction may be covalent bond formation between the thiol groups on the MPA-BNNTs and the surface of the gold nanoparticles. The interaction between the MPA thiol groups and the surface of the gold nanoparticles may be possible because of the relative lability of the DMAP molecules on the nanoparticles, which may allow the thiol groups to adsorb preferentially at the surface of the particles, thus facilitating assembly of the materials. FIG. 15d shows a TEM image of a MPA-BNNT which is half-coated by a sheath of gold nanoparticles. Such structures occur rarely and may be caused by a shadowing effect during the amine-functionalization of the BNNTs. Nanotube regions that are shadowed by other nanotubes may be unaffected by the plasma functionalization process and as a result would behave as unmodified BNNTs. i.e., would not be functionalized and thus would be unable to attach to the gold nanoparticles (see FIG. 12).

Figure 16:
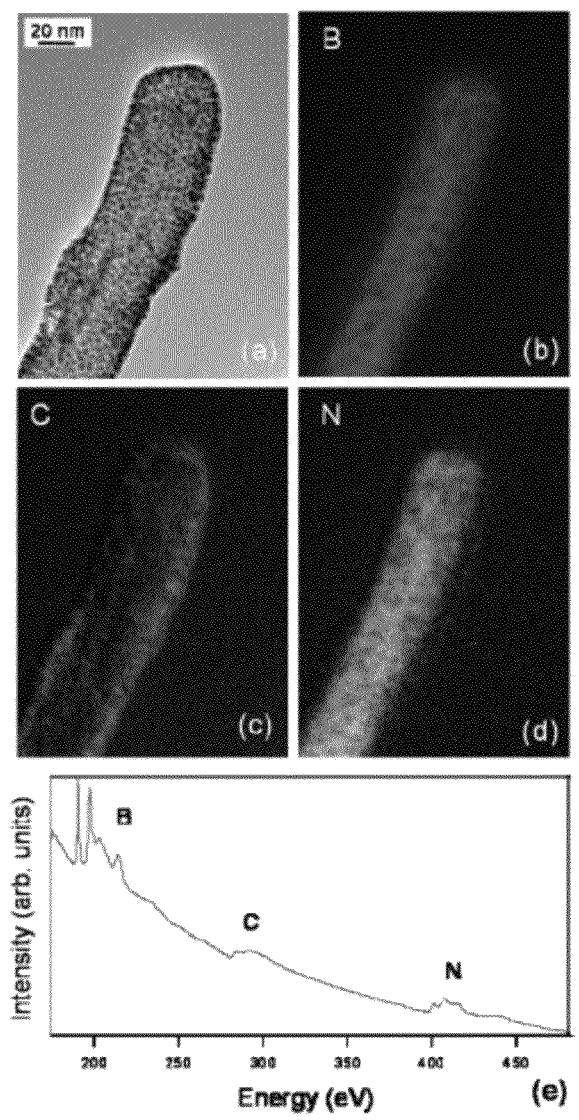
FIG. 16(a) is a bright-field TEM image of DMAP-Au nanoparticles self-assembled at the surface of MPA-BNNTs.
FIGS. 16(b), 16(c), 16(d) are elemental maps of the same area shown in FIG. 16(a).
FIG. 16(e) is an EEL (electron energy loss) spectrum of materials in (a).

Electron Energy Loss Spectroscopy (EELS) was used to characterize the assembly of gold nanoparticles at the surface of MPA-BNNTs, as shown in FIG. 16. The bright field TEM image in FIG. 16(a) shows a nanotube-nanoparticle assembly with a diameter of approximately 57 nm. From the elemental mapping images of B (boron) and N (nitrogen), FIGS. 16(b) and (d) respectively, the diameter of the structure attributed to these elements is estimated to be approximately 38 nm. The diameter of the carbon elemental map in FIG. 16(c) is approximately 57 nm This is consistent with an average diameter of the nanoparticles being 5 nm as measured by TEM while also accounting for both the organic layer at the surface of the nanotubes and the stabilizing ligands at the surface of the nanoparticles. FIG. 16(e) shows an EELS (electron energy loss spectroscopy) spectrum of the assembly and indicates that the composition ratio of B and N is nearly equal to 1, which is consistent with the stoichiometry of BNNTs.

For both the AF-BNNTs and the MPA-BNNTs, gold nanoparticles cover the nanotubes in a dense monolayer. As this does not occur for pristine BNNTs, the dense coverage of gold nanoparticles seems to be due to the significant functionalization of the surface of the BNNTs. Interaction between the materials may be mediated by a weak covalent bond in the case of the amine-functionalized BNNTs (AF-BNNTs) and by a strong covalent bond in the case of the thiol-modified BNNTs (MPA-BNNTs). This allows the immobilization of dense networks of gold nanoparticles on BNNTs, which can be used in the controlled assembly of nanoscale architectures and devices based on these and other materials.

Amine and thiol functional groups on BNNTs allow yet additional molecules, nanoparticles, and other materials to be immobilized at the surface of the BNNTs, mediated by weak and strong covalent bond formation depending on the material used. Examples of nanoparticles that can be attached to functionalized BNNTs include Au, Ag, Pd, CdS, CdSe, Pt, Co, CoPt, Cu, and ZnS nanoparticles. The functional group at the surface of the BNNT can be interchanged readily on account of the reactivity of groups such as amines and thiols. Such tuning of the interaction between nanoscale materials is of interest so that assembled materials can be further processed and immobilized or disassembled if desired. It is therefore clear that such an approach has a great deal of versatility, and that such functionalization allows leads to many possibilities for manipulation of chemical functionality at the surface of the BNNTs, which heretofore had not been possible.

INDUSTRIAL APPLICABILITY

There are many examples of structures and devices that can be made using functionalized BNNTs. For example, functionalized BNNTs can be used in electronic devices as interconnects, waveguides, inductors, capacitors, and transistors within electronic circuitry. Functionalized BNNTs can also act as heat sinks, electrostatic discharge materials (ESDMs), and insulating architectures when positioned appropriately within electronic circuitry, thus providing electronic device protection. Functionalized BNNTs may be used as functional coatings and shielding materials to modify the physical, electronic, or chemical properties of materials. Functionalized BNNTs may be integrated into a wide range of materials; the resulting novel hybrid materials may have properties vastly superior to the individual constituent elements. Functionalized BNNTs may be integrated with polymer or other host materials due to their modified surface properties, thus making novel composite materials with modified or enhanced physical, electronic and chemical properties. Functionalized. BNNTs may be applied as novel materials which facilitate the storage of gas molecules due to their modified surface chemistry. The attachment of technologically relevant materials to the surface of functionalized BNNTs would allow for the development of novel sensor materials with high sensitivity due to their nanoscale dimensions and high surface to volume ratio. Functionalized BNNTs could be assembled by solution-based self-assembly to form nanoscale architectures and controlled structures on desired substrates.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A method of modifying boron nitride nanotubes, comprising:
    a) providing the boron nitride nanotubes;
    b) placing the boron nitride nanotubes in a chamber equipped with a plasma generator; and
    c) exposing the boron nitride nanotubes to an ammonia plasma in the chamber to form amine-functionalized boron nitride nanotubes; and
    d) combining the amine-functionalized boron nitride nanotubes with a liquid 3-bromopropanoylchloride reagent to form a mixture.

2. The method of claim 1 wherein operation c) includes:
    i) pumping the chamber to a pressure less than or approximately equal to 0.3 Pascals;
    ii) flowing ammonia gas into the chamber;
    iii) applying a bias voltage of between about −50 volts and −200 volts 1 to the boron nitride nanotubes; and
    iv) applying power to the plasma generator.

3. The method of claim 2 wherein flowing the ammonia gas comprises flowing the ammonia gas at a rate of approximately 10 standard cubic centimeters per minute under a pressure of approximately 400 Pascals.

4. The method of claim 2 wherein the bias voltage is about −100 volts.

5. The method of claim 2 wherein the power is between about 100 watts and 500 watts.

6. The method of claim 2 wherein the power is about 200 watts.

7. A method of modifying boron nitride nanotubes, comprising:
    a) providing the boron nitride nanotubes;
    b) placing the boron nitride nanotubes in a chamber equipped with a plasma generator;
    c) exposing the boron nitride nanotubes to a plasma to form functionalized boron nitride nanotubes; and
    d) combining the functionalized boron nitride nanotubes with a liquid 3-bromopropanoylchloride reagent to form a mixture.

8. The method of claim 7 wherein operation c) includes:
    i) pumping the chamber to a pressure less than or approximately equal to 0.3 Pascals;
    ii) flowing a gas into the chamber;
    iii) applying a negative bias voltage to the boron nitride nanotubes; and
    iv) applying power to the plasma generator.

9. The method of claim 8 wherein the gas is selected from the group consisting of ammonia, $H_2+N_2$, $CH_4+O_2$, $CH_4+N_2$, $H_2O$, and $N_2+O_2$.

10. The method of claim 9 wherein the ammonia or the $H_2+N_2$ forms amine-functionalized boron nitride nanotubes.

11. The method of claim 9 wherein the $CH_4+O_2$ forms carboxyl-functionalized boron nitride nanotubes.

12. The method of claim 9 wherein the $CH_4+N_2$ forms imine-functionalized boron nitride nanotubes.

13. The method of claim 9 wherein the $H_2O$ forms hydroxyl-functionalized boron nitride nanotubes.

14. The method of claim 9 wherein the $N_2+O_2$ forms nitrile-functionalized boron nitride nanotubes.

15. The method of claim 7, further comprising:
    combining the functionalized boron nitride nanotubes with nanoparticles after operation c).

16. A method comprising:
    a) providing boron nitride nanotubes;
    b) placing the boron nitride nanotubes in a chamber equipped with a plasma generator; and c) exposing the boron nitride nanotubes to an ammonia plasma in the chamber to form amine-functionalized boron nitride nanotubes;
d) combining the amine-functionalized boron nitride nanotubes with de-ionized water to form a suspension; and
e) adding a solution of 3-mercaptopropionic acid, N-(3-dimethylaminopropyl)-N-ethylcarbodiimide hydrochloride, and 4-dimethylaminopyridine in de-ionized water to the suspension to form a mixture.

17. The method of claim 16 wherein operation c) includes:
i) pumping the chamber to a pressure less than or approximately equal to 0.3 Pascals;
ii) flowing ammonia gas into the chamber;
iii) applying a bias voltage of between about −50 volts and −200 volts to the boron nitride nanotubes; and
iv) applying power to the plasma generator.

18. The method of claim 17 wherein flowing the ammonia gas comprises flowing the ammonia gas at a rate of approximately 10 standard cubic centimeters per minute under a pressure of approximately 400 Pascals.

19. The method of claim 17 wherein the bias voltage is about −100 volts.

20. The method of claim 17 wherein the power is between about 100 watts and 500 watts.

21. The method of claim 17 wherein the power is about 200 watts.

22. A method comprising:
a) providing boron nitride nanotubes;
b) placing the boron nitride nanotubes in a chamber equipped with a plasma generator;
c) exposing the boron nitride nanotubes to a plasma to form functionalized boron nitride nanotubes;
d) combining the functionalized boron nitride nanotubes with de-ionized water to form a suspension; and
e) adding a solution of 3-mercaptopropionic acid, N-(3-dimethylaminopropyl)-N-ethylcarbodiimide hydrochloride, and 4-dimethylaminopyridine in de-ionized water to the suspension to form a mixture.

23. The method of claim 22 wherein operation c) includes:
i) pumping the chamber to a pressure less than or approximately equal to 0.3 Pascals;
ii) flowing a gas into the chamber;
iii) applying a negative bias voltage to the boron nitride nanotubes; and
iv) applying power to the plasma generator.

24. The method of claim 23 wherein the gas is selected from the group consisting of ammonia, $H_2+N_2$, $CH_4+O_2$, $CH_4+N_2$, $H_2O$, and $N_2+O_2$.

25. The method of claim 22, further comprising:
combining the functionalized boron nitride nanotubes with nanoparticles after operation c).

* * * * *